US005669366A

United States Patent [19]
Beach et al.

[11] Patent Number: 5,669,366
[45] Date of Patent: Sep. 23, 1997

[54] CLOSED CRANKCASE VENTILATION SYSTEM

[75] Inventors: Donald W. Beach; Peter K. Herman; Alan Bounnakhom, all of Cookeville, Tenn.; David M. Ruch, Columbus, Ind.; John M. Partridge, Columbus, Ind.; J. E. Parlow, Columbus, Ind.

[73] Assignee: Fleetguard, Inc., Nashville, Tenn.

[21] Appl. No.: 677,821

[22] Filed: Jul. 10, 1996

[51] Int. Cl.$^6$ ........................................ F02M 25/06
[52] U.S. Cl. ........................................ 123/572; 123/41.86
[58] Field of Search ........................ 123/572, 573, 123/574, 41.86

[56] References Cited

U.S. PATENT DOCUMENTS

| | | |
|---|---|---|
| 3,161,187 | 12/1964 | Parker . |
| 3,241,535 | 3/1966 | Drysdale . |
| 3,338,222 | 8/1967 | Rauen . |
| 3,550,570 | 12/1970 | Watson . |
| 4,616,620 | 10/1986 | Paoluccio ........................ 123/41.86 |
| 4,901,703 | 2/1990 | Humphries ........................ 123/572 |
| 5,069,192 | 12/1991 | Matsumoto et al. ............... 123/41.86 |
| 5,140,968 | 8/1992 | Doan ........................ 123/572 |
| 5,277,154 | 1/1994 | McDowell ........................ 123/41.86 |
| 5,429,101 | 7/1995 | Uebelhoer et al. .................. 123/572 |
| 5,479,907 | 1/1996 | Walker ........................ 123/41.86 |
| 5,499,616 | 3/1996 | Enright ........................ 123/572 |
| 5,564,401 | 10/1996 | Dickson ........................ 123/573 |

FOREIGN PATENT DOCUMENTS 25 32 131  2/1977  Germany .
60-81416A  5/1985  Japan .

*Primary Examiner*—Marguerite McMahon
*Attorney, Agent, or Firm*—Woodard, Emhardt, Naughton, Moriarty & McNett

[57] ABSTRACT

A closed crankcase ventilation system which relies on a vacuum assist from the turbocharger inlet to suction blow-by gases from the crankcase. The system includes a coalescer/filter which is operative to filter any oil particles which may be entrained in the blow-by gases before they are released into the turbocharger inlet. A pop off valve is also included in order to prevent the engine crankcase from becoming over pressurized as a result of back pressure caused by either a plugged coalescer/filter or some catastrophic engine malfunction. Further included is a vacuum limiting valve which prohibits the vacuum assist produced by the air inlet to the turbocharger from producing too low of an absolute pressure, thereby preventing an imbalance in pressure across the seals of the turbocharger. The system further includes a bypass valve which also prevents the crankcase from becoming over pressurized by routing the flow of blow-by gases around the coalescer/filter if the pressure in the crankcase becomes too great. Finally, the present invention incorporates a single mounting head which allows the various valves and filters of the present invention to be mounted thereon. The mounting head may then be conveniently attached to the engine at a single location.

14 Claims, 3 Drawing Sheets

CLOSED CRANKCASE VENTILATION SYSTEM

TECHNICAL FIELD OF THE INVENTION

The present invention relates generally to internal combustion engines and, more particularly, to a closed crankcase ventilation system.

BACKGROUND OF THE INVENTION

Ideally, the pressure within an internal combustion engine crankcase should be maintained at a level equal to or slightly less than atmospheric pressure to prevent external oil leakage through the various gasketed joints, such as that between the valve cover and the cylinder head. As is well known, in an internal combustion engine, a so-called blow-by gas is emitted in the crankcase as a result of leaks of intake air-fuel mixture and combustion gases through the clearances around piston rings during the compression, combustion and/or exhaust cycles. Because of these blow-by gases, the crankcase pressure will inherently rise, promoting leakage of oil from the crankcase. Originally, the crankcase pressure was vented to the atmosphere through a breather in order to solve this problem.

More recently, environmental considerations have dictated that the blow-by gases in the crankcase be vented back to the combustion chamber rather than being released to the atmosphere. Such closed crankcase ventilation (CCV) systems recycle the blow-by gas by burning these gases together with the intake air-fuel mixture.

In a turbocharged engine, the blow-by gas may be routed to the inlet of the turbocharger, with the turbocharger providing a vacuum assist to suction the blow-by gases from the crankcase. In such a system, however, it is necessary to provide some means for removing oil particles entrained in the blow-by gases prior to releasing these gases into the turbocharger, as well as some means to ensure that the engine crankcase will be neither over pressurized or subjected to too high of a vacuum. The present invention is directed toward meeting this need.

SUMMARY OF THE INVENTION

The present invention relates to a closed crankcase ventilation system which relies on a vacuum assist from the turbocharger inlet to suction blow-by gases from the crankcase. The system includes a coalescer/filter which is operative to filter any oil particles which may be entrained in the blow-by gases before they are released into the turbocharger inlet. A pop off valve is also included in order to prevent the engine crankcase from becoming over pressurized as a result of back pressure caused by either a plugged coalescer/filter or some catastrophic engine malfunction. Further included is a vacuum limiting valve which prohibits the vacuum assist produced by the air inlet to the turbocharger from producing too low of an absolute pressure, thereby preventing an imbalance in pressure across the seals of the turbocharger. The system further includes a bypass valve which also prevents the crankcase from becoming over pressurized by routing the flow of blow-by gases around the coalescer/filter if the pressure in the crankcase becomes too great. Finally, the present invention incorporates a single mounting head which allows the various valves and filters of the present invention to be mounted thereon. The mounting head may then be conveniently attached to the engine at a single location.

In one form of the invention, a closed crankcase ventilation system is disclosed, comprising: an inlet adapted to receive blow-by gases from an engine crankcase; an outlet adapted to supply the blow-by gases to an air inlet of the engine; a low pressure filter; a coalescer/filter; and a bypass valve coupled to the low pressure filter and to the coalescer/filter; wherein the bypass valve has a first position which causes the blow-by gases to pass from the inlet, through the low pressure filter and into the outlet; and wherein the bypass valve has a second position which causes the blow-by gases to pass from the inlet, through the coalescer/filter and into the outlet.

In another form of the invention, a closed crankcase ventilation system is disclosed, comprising: an inlet adapted to receive blow-by gases from an engine crankcase; an outlet adapted to supply the blow-by gases to an air inlet of the engine; a pop off valve having an input and an output, wherein the input is coupled to the inlet and the output is operative to vent the blow-by gas outside the system when a crankcase pressure exceeds a first predetermined value; and a coalescer/filter coupled between the inlet and the outlet for flow of blow-by gases therethrough.

In another form of the invention, a closed crankcase ventilation system is disclosed, comprising an inlet adapted to receive blow-by gases from an engine crankcase; an outlet adapted to supply the blow-by gases to an air inlet of the engine; a low pressure filter; a coalescer/filter; and a bypass valve coupled to the low pressure filter and to the coalescer/filter; wherein the bypass valve has a first position which causes the blow-by gases to pass from the inlet, through the low pressure filter and into the outlet; wherein the bypass valve has a second position which causes the blow-by gases to pass from the inlet, through the coalescer/filter and into the outlet; a vacuum limiting valve coupled between the inlet and the outlet and operative to discontinue blow-by gas flow from the inlet to the outlet when a crankcase pressure falls below a predetermined value; and a pop off valve coupled to the inlet and operative to vent the blow-by gas outside the system when a crankcase pressure exceeds a predetermined value.

DETAILED DESCRIPTION OF THE PREFERRED EMBODIMENTS

Figure 1:
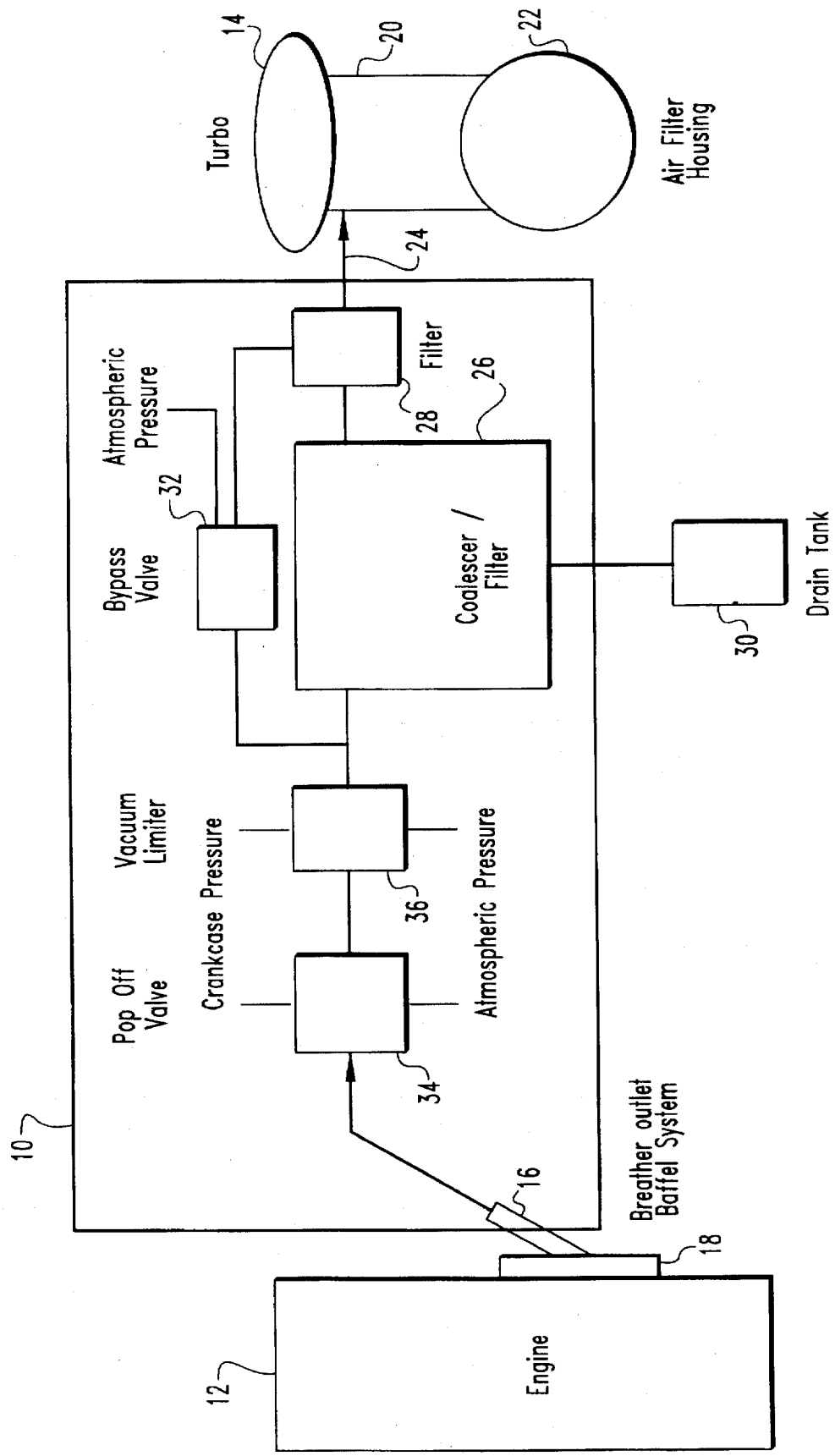
FIG. 1 is a schematic diagram of a first embodiment of the closed crankcase ventilation system of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIG. 1 illustrates a first embodiment of the closed crankcase ventilation (CCV) system of the present invention, indicated generally at 10. The CCV system 10 is coupled between an internal combustion engine 12 and a turbocharger 14. The inlet 16 to the CCV system 10 is coupled to a breather outlet baffel system 18 of the engine 12 in order to pass engine crankcase blow-by gases from the engine 12 to the CCV system 10. The turbocharger 14 includes a first air inlet 20 through which it suctions intake air through an air filter housing 22. The turbocharger 14 also includes an additional inlet tube 24 which couples the outlet of the CCV system 10 to the air inlet 20. This provides a vacuum assist for suctioning the crankcase blow-by gases from the engine 12 through the CCV system 10 and into the turbocharger inlet 20.

The gas flow path through the CCV system 10 is routed through either a coalescer/filter 26 or a low pressure filter 28. The low pressure filter 28 is operative to filter relatively large drops of oil in the blow-by gases, thereby preventing most of the oil in the blow-by gases from entering the turbocharger 14. The coalescer/filter 26 is additionally operative to separate the oil mist which is entrained in the blow-by gases, thereby providing a much greater level of oil filtration than provided by the filter 28. The coalescer/filter 26 is coupled to a drain tank 30 for collection of the filtered oil. The coalescer/filter 26 is preferably a 95% efficient, 3 micron coalescer/filter.

The normal path of gases through the CCV system 10 is through the coalescer/filter 26. This is preferred because of the greater level of filtering provided by the coalescer/filter 26 as opposed to the low pressure filter 28. However, the coalescer/filter 26 creates a larger back pressure on the crankcase of the engine 12, and this back pressure becomes increasingly great as the coalescer/filter 26 becomes clogged with material from the filtered oil. In order to prevent the crankcase of the engine 12 from becoming pressurized above a predetermined level, the CCV system 10 incorporates a bypass valve 32 which is operative to selectively route the blow-by gases through either the coalescer/filter 26 or the low pressure filter 28. Alternatively, activation of the bypass valve 32 could allow parallel flow through the filter/coalescer 26 and the low pressure filter 28. The bypass valve 32 includes a reference input which is coupled to atmospheric pressure, as well as a measurement input which is coupled to the crankcase pressure. When the crankcase pressure rises above a predetermined level (e.g. 2" $H_2O$), the bypass valve switches the flow of blow-by gases from the coalescer/filter 26 to the low pressure filter 28. Once the pressure in the crankcase has fallen to below a second predetermined level (e.g. 1" $H_2O$), the bypass valve 32 switches the flow of blow-by gases back through the coalescer/filter 26. In this way, maximum filtration of oil from the blow-by gases is achieved while ensuring that the pressure within the engine 12 crankcase does not become too great. It will be appreciated by those skilled in the art that the bypass valve 32 may be located between the engine 12 and the filters 26, 28 instead of in the position shown in FIG. 1.

Excess pressure within the engine 12 crankcase is further regulated by a pop off valve 34 coupled to the CCV system 10 inlet 16. Like the bypass valve 32, the pop off valve 34 includes a reference input coupled to atmospheric pressure, as well as a measurement input coupled to the crankcase pressure. In situations where both of the filters 26, 28 become plugged, or in situations where there is a catastrophic engine malfunction producing large quantities of blow-by gases, the pressure within the engine 12 crankcase will rise dramatically, which can result in improper engine operation or significant engine damage. In order to prevent this, the pop off valve 34 is operative to vent the crankcase gases to the atmosphere if the crankcase pressure exceeds a predetermined limit (e.g. >20" $H_2O$). In this way, the pop off valve 34 effectively disables the CCV system 10 in situations where use of the CCV system 10 would damage the engine 12.

The CCV system 10 further includes a vacuum limiting valve 36 mounted in the flow of blow-by gases. Like the bypass valve 32 and the pop off valve 34, the vacuum limiting valve 36 includes a reference input coupled to atmospheric pressure and a measurement input coupled to the crankcase pressure. The vacuum limiting valve 36 operates to prevent the crankcase pressure from becoming too low. If the vacuum assist produced by the air inlet 24 of the turbocharger 14 is not regulated, it is possible to produce too low of an absolute pressure within the system, causing an imbalance in pressure across the seals of the turbocharger 14. This contributes to the breakdown of the turbocharger 14 seals. In order to prevent this, the vacuum limiter is activated when pressure within the engine 12 crankcase falls lower than a predetermined amount (e.g. −2" $H_2O$). When this predetermined level is reached, the vacuum limiting valve 36 closes, thereby preventing the turbocharger 14 inlet 24 from suctioning any further gas from the engine 12 crankcase. Once the pressure within the engine 12 crankcase returns to a second predetermined level (e.g. −1" $H_2O$), the vacuum limiting valve 36 opens, resuming normal operation of the CCV system 10.

Figure 2:
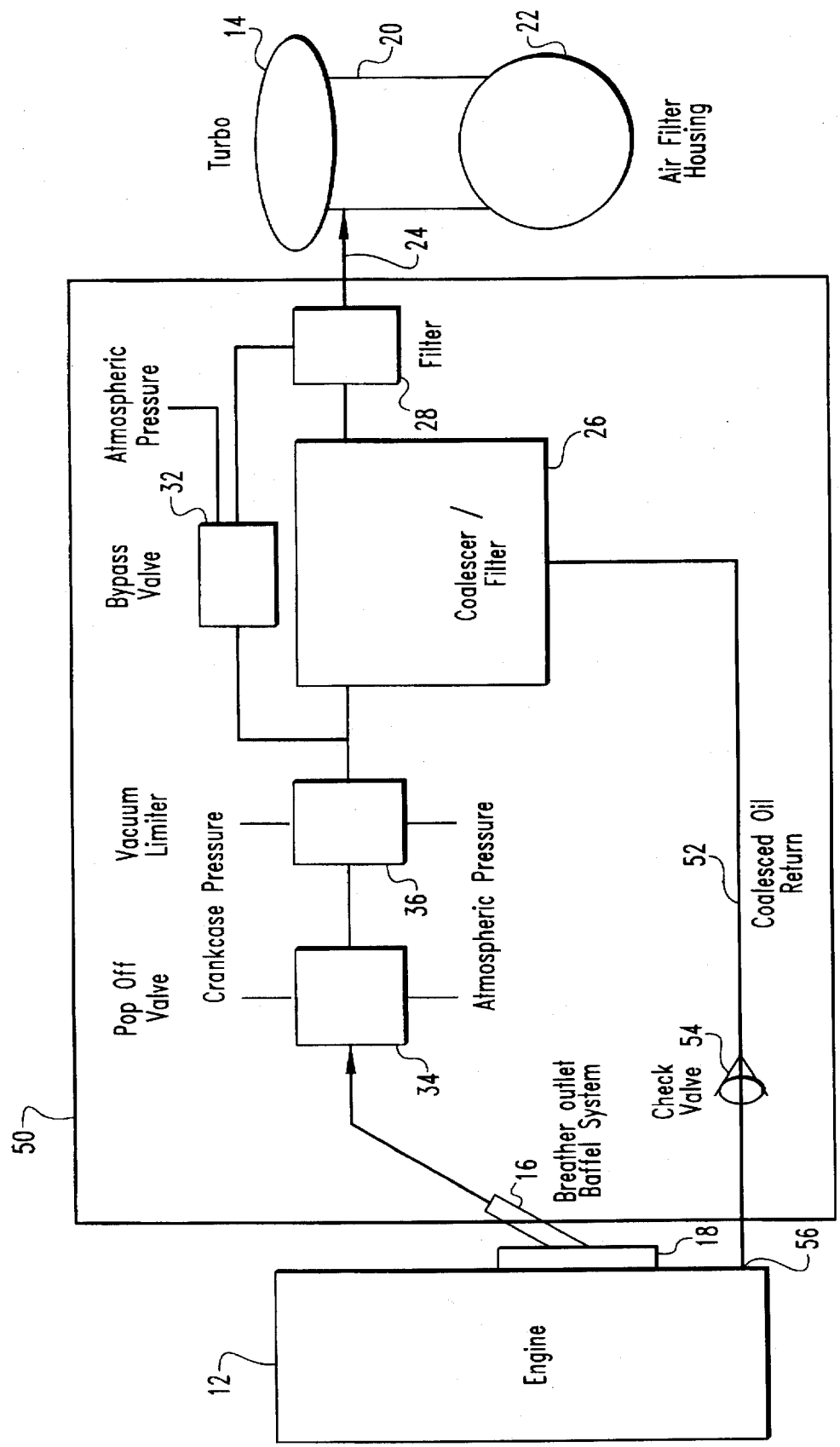
FIG. 2 is a schematic diagram of a second embodiment of the closed crankcase ventilation system of the present invention.

It will be appreciated by those skilled in the art that the CCV system 10 of the present invention provides a flow path for blow-by gases to be routed from the engine 12 crankcase to the turbocharger 14 while automatically preventing over- or under-pressure of the engine 12 crankcase and while providing the maximum feasible level of oil filtration. These advantages are also provided by a second embodiment closed crankcase ventilation system illustrated in FIG. 2 and indicated generally at 50. The CCV system 50 is identical to the CCV system 10 of FIG. 1, with the exception that the filtered oil from the filters 26, 28 is not dumped to a drain tank 30. Instead, the filtered oil from both filters is routed into a coalesced oil return 52 and is returned to the engine 12 crankcase via the inlet 56. A check valve 54 is placed in the oil return line 52 in order to prevent oil from returning from the engine 12 crankcase to the filters 26, 28. In all other respects, the CCV system 50 of FIG. 2 operates identically to the CCV system 10 of FIG. 1.

Figure 3:
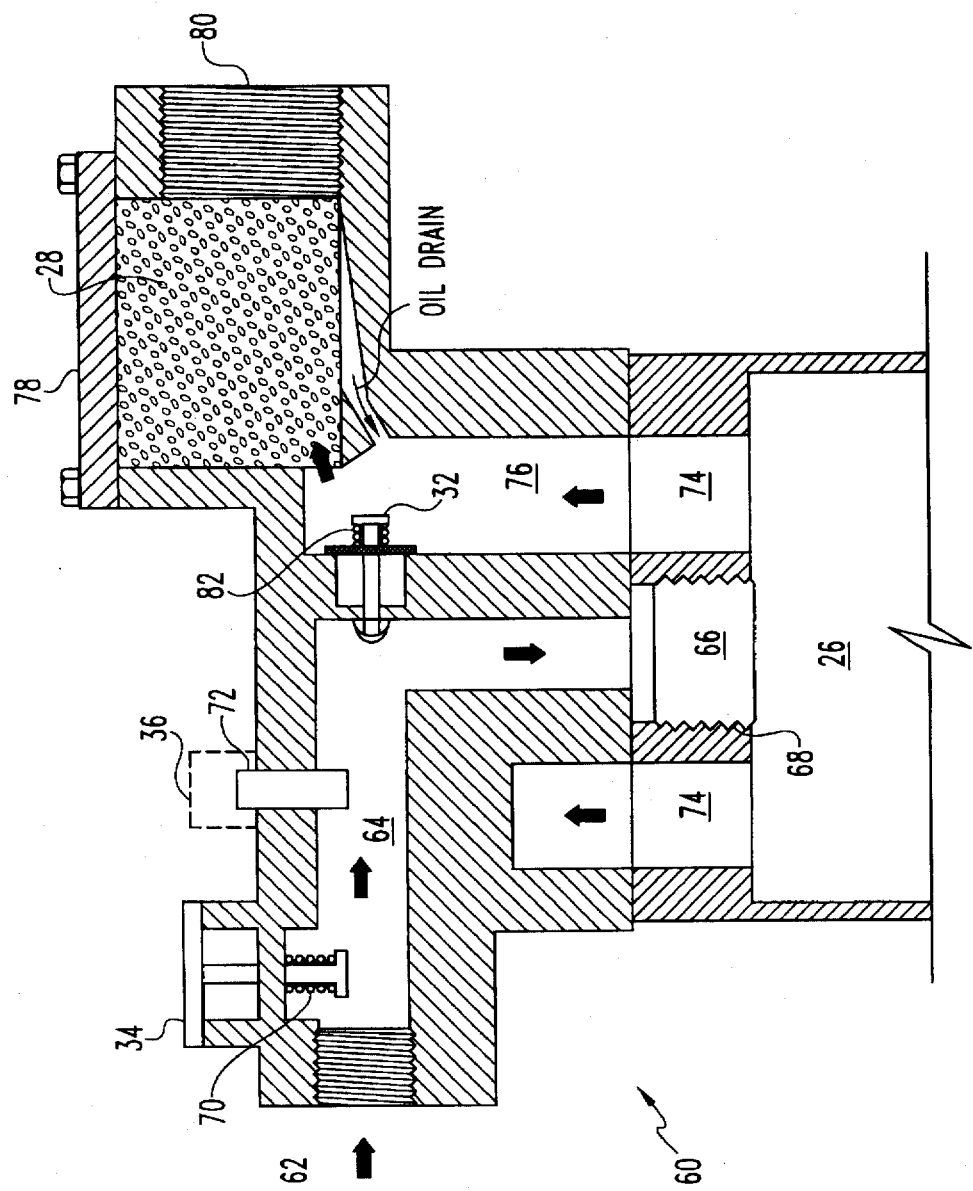
FIG. 3 is a cross-sectional schematic view of a first embodiment unitary mounting head of the closed crankcase ventilation system of the present invention.

The CCV system 10 or 50 of the present invention may conveniently be located in a unitary mounting head 60 as illustrated in FIG. 3. The unitary mounting head 60 provides mounting locations for the pop-off valve 34, the vacuum limiting valve 36, the bypass valve 32, the low pressure filter 28 and the filter/coalescer 26 as well as gas flow paths between each of these devices. The mounting head 60 includes an inlet 62 for coupling to the breather outlet 16 of the engine crankcase. The inlet 62 is preferably threaded in order to facilitate connection to the engine crankcase. The inlet 62 leads to an internal passage 64 which communicates with an input 66 of the filter/coalescer 26. The input 66 of the filter/coalescer 26 includes a threaded surface which mates with the threaded surface 68 of the mounting head 60. The flow of gas into the inlet 62 is normally routed by the passage 64 into the input 66 of the filter/coalescer 26. However, the pop-off valve 34 is in communication with the passage 64, such that the pop-off valve may vent the gas flow to the atmosphere if the pressure within the passage 64 rises above a predetermined pressure. The pressure at which the pop-off valve activates is determined by the force exerted upon the pop-off valve by the spring 70, as is known in the art.

The internal passage 64 is further in communication with a vacuum limiting vane 36 which is operative to close the passage 64 when the crankcase pressure becomes too low. The vacuum limiting valve 36 may close off the passage 64, for example, by moving a plunger 72 into the passage 64, thereby blocking any further flow of gas therethrough, as is known in the art.

Filtered gases exiting the filter/coalescer 26 flow into an annular passage 74 and then into connecting passage 76. The connecting passage 76 terminates at the low pressure filter 28, which may be conveniently replaced by access through the cover panel 78. The mounting head 60 further includes an output 80 (preferably threaded) which couples the output of the low pressure filter 28 to the turbocharger inlet 24. The oil drain from the low pressure filter 28 directs the oil flow back to the connecting passage 76.

In the event that the filter/coalescer 26 becomes clogged, thereby increasing the pressure within the passage 64, the bypass valve 32 is opened. The opening of bypass valve 32 forms a direct connection between the passages 64 and 76, thereby bypassing the filter/coalescer 26. The pressure at which the bypass valve 32 is opened is determined by the force generated by the spring 82, as is known in the art.

It will be appreciated by those skilled in the art that the unitary mounting head 60 of FIG. 3 provides a single, convenient location for mounting the various valves and filters of the present invention. This allows the CCV system of the present invention to be assembled as a single unitary structure and then easily coupled into an internal combustion engine. By using the mounting head 60, only two connections are required to the engine: one at the crankcase breather outlet 16 and the other at the turbocharger inlet 24. This greatly facilitates incorporation of the CCV system of the present invention to an internal combustion engine.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A closed crankcase ventilation system, comprising:
    an inlet adapted to receive blow-by gases from an engine crankcase;
    an outlet adapted to supply the blow-by gases to an air inlet of the engine;
    a low pressure filter;
    a coalescer/filter; and
    a bypass valve coupled to the low pressure filter and to the coalescer/filter;
    wherein the bypass valve has a first position which causes the blow-by gases to pass from the inlet, through the low pressure filter and into the outlet; and
    wherein the bypass valve has a second position which causes the blow-by gases to pass from the inlet, through the coalescer/filter and into the outlet.

2. The closed crankcase ventilation system of claim 1, wherein the bypass valve switches to the first position when a crankcase pressure exceeds a first predetermined value; and
    wherein the bypass valve switches to the second position when the crankcase pressure falls below a second predetermined value.

3. The closed crankcase ventilation system of claim 1, further comprising:
    a drain tank coupled to the coalescer/filter and operative to receive oil removed from the blow-by gases.

4. The closed crankcase ventilation system of claim 1, further comprising:
    an oil return line coupled between the coalescer/filter and the crankcase and operative to return oil removed from the blow-by gases to the crankcase.

5. The closed crankcase ventilation system of claim 1, wherein the air inlet comprises a turbocharger inlet.

6. The closed crankcase ventilation system of claim 1, further comprising:
    a vacuum limiting valve coupled between the inlet and the outlet and operative to discontinue blow-by gas flow from the inlet to the outlet when a crankcase pressure falls below a predetermined value.

7. The closed crankcase ventilation system of claim 1, further comprising:
    a pop off valve coupled to the inlet and operative to vent the blow-by gas outside the system when a crankcase pressure exceeds a predetermined value.

8. A closed crankcase ventilation system, comprising:
    an inlet adapted to receive blow-by gases from an engine crankcase;
    an outlet adapted to supply the blow-by gases to an air inlet of the engine;
    a pop off valve having an input and an output, wherein the input is coupled to the inlet and the output is operative to vent the blow-by gas outside the system when a crankcase pressure exceeds a first predetermined value; and
    a coalescer/filter coupled between the inlet and the outlet for flow of blow-by gases therethrough a low pressure filter: and
    a bypass valve coupled to the low pressure filter and to the coalescer/filter;
    wherein the bypass valve has a first position which causes the blow-by gases to pass from the inlet, through the low pressure filter and into the outlet; and
    wherein the bypass valve has a second position which causes the blow-by gases to pass from the inlet, through the coalescer/filter and into the outlet.

9. The closed crankcase ventilation system of claim 8, wherein the bypass valve switches to the first position when a crankcase pressure exceeds a second predetermined value; and
    wherein the bypass valve switches to the second position when the crankcase pressure falls below a third predetermined value.

10. The closed crankcase ventilation system of claim 8, further comprising:
    a drain tank coupled to the coalescer/filter and operative to receive oil removed from the blow-by gases.

11. The closed crankcase ventilation system of claim 8, further comprising:
    an oil return line coupled between the coalescer/filter and the crankcase and operative to return oil removed from the blow-by gases to the crankcase.

12. The closed crankcase ventilation system of claim 8, wherein the air inlet comprises a turbocharger inlet.

13. The closed crankcase ventilation system of claim 8, further comprising:
    a vacuum limiting valve coupled between the inlet and the outlet and operative to discontinue blow-by gas flow from the inlet to the outlet when the crankcase pressure falls below a predetermined value.

14. A closed crankcase ventilation system, comprising:
- an inlet adapted to receive blow-by gases from an engine crankcase;
- an outlet adapted to supply the blow-by gases to an air inlet of the engine;
- a low pressure filter;
- a coalescer/filter;
- a bypass valve coupled to the low pressure filter and to the coalescer/filter;
- wherein the bypass valve has a first position which causes the blow-by gases to pass from the inlet, through the low pressure filter and into the outlet;
- wherein the bypass valve has a second position which causes the blow-by gases to pass from the inlet, through the coalescer/filter and into the outlet;
- a vacuum limiting valve coupled between the inlet and the outlet and operative to discontinue blow-by gas flow from the inlet to the outlet when a crankcase pressure falls below a first predetermined value; and
- a pop off valve coupled to the inlet and operative to vent the blow-by gas outside the system when the crankcase pressure exceeds a second predetermined value.

* * * * *